US009516291B2

(12) United States Patent
Toye et al.

(10) Patent No.: US 9,516,291 B2
(45) Date of Patent: Dec. 6, 2016

(54) TELEVISION SYSTEMS INCORPORATING SEPARATE A/V PROCESSING SYSTEMS AND TELEVISION DISPLAYS

(71) Applicant: The Board of Trustees of the Leland Stanford Junior University, Palo Alto, CA (US)

(72) Inventors: George Toye, Foster City, CA (US); Larry J. Leifer, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 14/557,205

(22) Filed: Dec. 1, 2014

(65) Prior Publication Data

US 2016/0156873 A1 Jun. 2, 2016

(51) Int. Cl.
*H04N 5/44* (2011.01)
*H04N 11/20* (2006.01)
*H04N 5/63* (2006.01)
*H04N 5/64* (2006.01)

(52) U.S. Cl.
CPC ............... *H04N 11/20* (2013.01); *H04N 5/44* (2013.01); *H04N 5/63* (2013.01); *H04N 5/64* (2013.01)

(58) Field of Classification Search
CPC .......... H04N 5/765; H04N 5/63; H04N 5/445; H04N 5/268; H04N 7/17318; H04N 7/0117; H04N 7/0102; H04N 11/20; H04N 9/74; H04N 5/44; H04N 5/64; H04N 7/01; G06F 3/143; G06F 3/038; G06F 3/048

USPC ......................... 348/552, 564, 730, 725, 726
See application file for complete search history.

(56) References Cited

U.S. PATENT DOCUMENTS

| 6,008,777 | A | * | 12/1999 | Yiu | G06F 3/038 341/173 |
| 6,084,638 | A | * | 7/2000 | Hare | G06F 3/14 348/552 |
| 6,806,859 | B1 | | 10/2004 | Kanoh et al. | |
| 8,804,043 | B2 | * | 8/2014 | Kang | H04N 5/765 348/564 |

(Continued)

OTHER PUBLICATIONS

"AN-WL100 Wireless Media Kit", LG Electronics, 2010, Retrieved from: https://www.lg.com/us/products/documents/lg_he_accessory_ss_AN-WL100.pdf , 1 pg.

(Continued)

*Primary Examiner* — Trang U Tran
(74) *Attorney, Agent, or Firm* — KPPB LLP (57) ABSTRACT

Television systems are disclosed that incorporate separate A/V processing systems and television displays. The television displays can receive video driving signals wirelessly from the A/V processing system that can be used to directly drive the display driver of the television display. By separating the electronics used to receive various input sources of audio and video (A/V) content from the television display, the television display can be designed to consume less power, can be manufactured to be significantly lighter and can be installed with fewer cables. Indeed, cables can be eliminated entirely, where the A/V processing system communicates wirelessly with the television display and the television display obtains power wirelessly from a wireless power supply.

22 Claims, 6 Drawing Sheets

(56) References Cited

U.S. PATENT DOCUMENTS

| | | | | |
|---|---|---|---|---|
| 2008/0120675 | A1* | 5/2008 | Morad | H04N 7/17318 725/120 |
| 2008/0123739 | A1 | 5/2008 | Reznic et al. | |
| 2011/0224992 | A1* | 9/2011 | Chaoui | G10L 19/018 704/500 |

OTHER PUBLICATIONS

"Connect Wirelessly Media Kit", LG Electronics, Retrieved from: www.lg.com/us/tv-accessories/lg-AN-WL100W-wireless-media-kit, Retrieved on: Nov. 17, 2013, 2 pgs.

"Digital Set-Top Box", ARM The Architecture for the Digital World, Retrieved from: www.arm.com/markets/home/digital-set-top-box.php, Retrieved on: Nov. 11, 2013, 2 pgs.

"H.264/MPEG-2 HDTV Decoder", Fujitsu, Retrieved from: www.fujitsu.com/emea/services/microelectronics/mpeg/multistandard/, Retrieved on: Nov. 11, 2013, 3 pgs.

"Introduction to graphics and LCD technologies", NXP, Retrieved from: http://www.nxp.com/wcm_documents/techzones/microcontrollers-techzone/Presentations/graphics.lcd.technologies.pdf, 33 pgs.

"Introduction to WrelessHD Technology", WrelessHD, Retrieved from: www.wirelesshd.org/about/technology/, Retrieved on Nov. 17, 2013, 4 pgs.

"LG LED LCD TV Owner's Manual", LG Electronics Inc., www.lgusa.com, 2009, 138 pgs.

"Marvell Armada 1500 Google TV Reference Design", CNXSoft—Embedded Software Development, Jan. 6, 2012, Retrieved from: www.cnx-software.com/2012/01/06/google-tv-moves-to-marvell-armada-1500-arm-processor/, Retrieved on: Nov. 11, 2013, 8 pgs.

"Operation: How to Change the Picture Settings on Your LED TV", Samsung, Last Updated: Sep. 4, 2013, Retrieved from: www.samsung.com/us/support/howtoguide/N0000000/9488/0/N/3/M/, Retrieved on: Dec. 1, 2013, 4 pgs.

"ScreenCast AV 4 Wireless AV-to-HDTV Adapter", Belkin International, Inc., Retrieved from: https://web.archive.org/web/20140915013722/http://www.belkin.com/us/p/P-F7D4515/, Retrieved on: Aug. 11, 2016, 1 pg.

"Set-top Box", Fairchild Semiconductor, 2003, Retrieved from: www.fairchildsemi.com/applications/consumer/set-top-box/, Retrieved on Nov. 11, 2013, 2 pgs.

"Specification Summary", Wireless HD, Retrieved from: www.wirelesshd.org/about/specification-summary/, Retrieved on: Nov. 17, 2013, 2 pgs.

"STB / DVR / Streaming Media", Texas Instruments, Inc., Retrieved from: www.ti.com/solution/stb-streaming-media-diagram#Design Considerations, Retrieved on: Nov. 11, 2013, 10 pgs.

"STB / DVR / Streaming Media", Texas Instruments, Inc., Retrieved from: www.ti.com/solution/stb-streaming-media-diagram, Retrieved on: Nov. 11, 2013, 10 pgs.

"WHDI Products", WHDI Wireless Home Digital Interface, Printed from: https://web.archive.org/web/20141106090240/http://www.whdi.org/Products, Printed on: Aug. 11, 2016, 4 pgs.

"Wireless Home Digital Interface", Wikipedia, Last Modified on Dec. 4, 2015, Retrieved from: http://en.wikipedia.org/wiki/Wireless_Home_Digital_Interface, Retrieved on: Aug. 11, 2016, 3 pgs.

"WirelessHD Specification Version 1.1 Overview", WirelessHD, May 2010, Retrieved from: http://www.wirelesshd.org/pdfs/WirelessHD-Specification-Overview-v1.1May2010.pdf, 95 pgs.

D'Orazio, Dante, "Completely Wireless' 55-inch LCD TV uses WHDI, lacks a power plug", The Verge, Jan. 19, 2012, Retrieved from: http://www.theverge.com/hd/2012/1/19/2719644/haier-completely-wireless-tv-whdi-no-cables, 2 pgs.

Gonzales et al., "Digital Video Using DaVinci SoC", Texas Instruments, Application Report Spraano, Jun. 2007, 44 pgs.

IP, Eugenie, "High Performance TFT LCD Driver ICs for Large-Size Displays", Solomon Systech Limited, Retrieved from: http://www.solomon-systech.com/files/ck/files/Technical%20Articles/Liquid%20Crystal%20Display%20ICs%20for%20Large-Size%20Displays_0609.pdf, 9 pgs.

Katz et al., "Blackfin Processor's Parallel Peripheral Interface Simplifies LCD Connection in Portable Multimedia", Analog Dialogue, vol. 39, Jan. 2005, Retrieved from: www.analog.com/library/analogdialogue/archives/39-01-lcd_drive.html, Retrieved on Nov. 11, 2013, 7 pgs.

Murph, Darren, "LG to ship HDTVs with WHDI wireless technology baked in", Engadget, Jan. 6, 2010, Retrieved from: www.engadget.com/2010/01/06/lg-to-ship-hdtvs-with-whdi-wireless-technology-baked-in/, Retrieved on: Nov. 17, 2013, 3 pgs.

Murph, Darren, "Sharp's X-Series LCD HDTVs offered with WHDI wireless link", Engadget, Apr. 30, 2008, Retrieved from: http://www.engadget.com/2008/04/30/sharps-x-series-lcd-hdtvs-offered-with-whdi-wireless-link/, Retrieved on: Aug. 11, 2016, 3 pgs.

Schulman, Jacob, "Haier's wireless HDTV lacks wires, svelte profile (video)", Engadget, Jan. 7, 2010, Retrieved from: http://www.engadget.com/2010/01/07/haiers-wireless-hdtv-lacks-wires-svelte-profile-video/, 2 pgs.

\* cited by examiner

TELEVISION SYSTEMS INCORPORATING SEPARATE A/V PROCESSING SYSTEMS AND TELEVISION DISPLAYS

FIELD OF THE INVENTION

The present application relates generally to display of audio and video content and more specifically to generation of video driving signals for television displays remotely from the television displays.

BACKGROUND

Multimedia content is available from an increasing array of sources and televisions are increasingly manufactured to accept content from as many of these sources as possible. In order to receive broadcast television content, a television typically includes an analog front end to enable the television to tune to a broadcast signal received via an antenna. The analog signal is digitized and processing circuitry within the television decodes the broadcast content using the digitized signal. A television can also receive multimedia content from a number of external sources via external input interfaces such as (but not limited to) content received via the High-Definition Multimedia Interface (HDMI) specified by the HDMI Forum of Sunnyvale Calif., and the various Universal Serial Bus (USB) standards specified by the USB Implementers Forum, Inc. of Portland, Oreg. In order to receive content via these interfaces, televisions typically include multiple physical connectors. Many televisions also possess the ability to connect to the Internet and stream multimedia content. Such televisions can include a network interface controller such as an Ethernet network controller complying with the IEEE 802.3ab standard or a wireless connect to the Internet via a physical interface such as the 802 or a wireless network interface controller that enables transmission of data over a Wi-Fi network implemented in accordance with any of the IEEE 802.11 standards. Wi-Fi is a technology promoted by the Wi-Fi Alliance of Austin, Tex.

SUMMARY OF THE INVENTION

Television systems in accordance with embodiments of the invention incorporate separate A/V processing systems and television displays. In several embodiments, the television displays include any of a variety of display technologies for presenting and/or projecting an image or video sequence and a display driver that drives the display technology. In several embodiments, the television display receives video driving signals wirelessly from the A/V processing system that can be used to directly drive the display driver of the television display. By separating the electronics used to receive various input sources of audio and video (A/V) content from the television display, the television display can be designed to consume less power, can be manufactured to be significantly lighter and can be installed with fewer cables. Indeed, cables can be eliminated entirely in embodiments in which the A/V processing system communicates wirelessly with the television display and the television display obtains power wirelessly from a wireless power supply. The comparative reduction of weight in the television display associated with relocating the varied analog and digital front ends used to receive broadcast television and various input interface connectors can be significant and can reduce the structural rigidity required from the television display relative to conventional televisions. As a result, the experience of mounting a television display in accordance with an embodiment of the invention can be similar to that of hanging a picture. In addition, the television display's reduced support structure enables customization to conform to the décor of the environment containing the television display.

Once installed, a television display in accordance with embodiments of the invention can receive a video driving signal from the A/V processing system that is generated by decoding a video input signal and then generating a video driving signal that is consistent with and specific to the native resolution and supported refresh rates of the television display. In many embodiments, the process of generating the video driving signal can involve performing any of the processes that are typically performed by a conventional television in converting a decoded video signal into digital image data that can be used to drive a pixel array such as (but not limited to) de-interlacing the received video, performing scan-rate conversion, performing chroma resampling and color conversion, rescaling the video to the television display resolution, and/or performing bit extraction and byte packing to format the bits of the digital image data for each pixel for provision as an input to the display driver of the pixel array of the television display.

Much of the discussion that follows describes television systems in accordance with embodiments of the invention in which the television display does not include the typical RF tuner and interface electronics found in conventional televisions. Television displays in accordance with several embodiments the invention can, however, include such electronics and a video driving signal received from an A/V processing system is simply yet another video input. Such television displays may enjoy the benefit of a reduction in the cabling connected to the television display compared to a conventional television. In addition, the A/V processing system can provide for upgradeable video and/or audio decoding performance. In many embodiments, the A/V processing system incorporates expansion slots. In this way, the video processing can be continuously expanded to accommodate new video sources and/or new networking technologies irrespective of the capabilities of the television display.

One embodiment includes a television display and an audio and video (A/V) processing system housed separately from the television display. The television display includes: a pixel array formed by rows and columns of pixels having a native resolution that are configured to be illuminated at one or more supported refresh rates using timing and control signals; an input interface configured to receive video driving signals, where the video driving signals comprise digital image data for each of the pixels in the pixel array at a supported refresh rate; a display driver configured to generate timing and control signals to drive the pixel array based upon the video driving signals; a power supply configured to provide power to the pixel array, the input interface and the display driver. In addition, the video processing system includes: a processor; and a memory containing: a media director application; a video processing application; at least one audio codec; at least one video codec; and an operating system. The video processing system also includes: a plurality of input interfaces configured to receive encoded A/V data, where the plurality of input interfaces comprises a radio frequency tuner configured to receive a broadcast television A/V signal; a processed video output interface; a power supply configured to power the processor, memory, and processed video output interface. Furthermore, the media director application configures the processor to: select an A/V source from the plurality of input interfaces; decode audio data and video data from the selected A/V source using the at least one audio codec and the at least one video codec; generate video driving signals from the decoded video data using the video processing application, where the video driving signals includes digital image data at a resolution consistent with the native resolution of the pixel array in the television display and a supported refresh rate of the pixel array of the television display; and output the video driving signal to the television display via the processed video output interface.

In a further embodiment, the video driving signals further include timestamps, and the display driver is configured to generate timing and control signals to drive the pixel array based upon the video driving signals by: generating timing signals using the timestamps; and mapping the digital image data for each pixel to a control signal for each pixel.

In another embodiment, the A/V processing system is configured to wirelessly transmit the video driving signal to the television display using the processed video output interface.

In a still further embodiment, the A/V processing system is configured to transmit the video driving signal to the television display via a wired connection using the processed video output interface.

Still another embodiment also includes a wireless power supply including a wireless power transmitter. In addition, the power supply of the television display includes a wireless power receiver configured to receive a power from a wireless power signal transmitted by the wireless power supply.

A yet further embodiment also includes a television display power supply separately housed from the television display and configured to provide a direct current (D.C.) output. In addition, the power supply of the television display is configured to receive the D.C. output of the television display power supply.

In yet another embodiment, the media director application configures the processor to generate video driving signals from the decoded video data using the video processing application by performing at least one process selected from the group consisting of: di-interlacing the decoded video data; performing scan-rate conversion on the decoded video data to match the frame rate of the decoded video data to a supported refresh rate of the pixel array of the television display; performing chroma resampling of the decoded video data; converting a color space of the decoded video data to a color space of the display driver; rescaling the decoded video data to the native resolution of the pixel array; and performing bit extraction and byte packing.

In a further embodiment again, the media director application configures the processor to generate video driving signals from the decoded video data using the video processing application by converting a color space of the decoded video data to a color space of the display driver.

In another embodiment again, converting the color space of the decoded video data to the color space of the display driver comprises converting the color space of the decoded video data to a gamma corrected color space.

In a further additional embodiment, converting the color space of the decoded video data to the color space of the display driver comprises converting the color space of the decoded video data to a color space selected by a user command from a plurality of predetermined color spaces.

In another additional embodiment, the media director application also configures the processor to generate video driving signals from the decoded video data using the video processing application by: performing scan-rate conversion on the decoded video data to match the frame rate of the decoded video data to a supported refresh rate of the pixel array of the television display; and rescaling the decoded video data to the native resolution of the pixel array.

In a still yet further embodiment, the digital image data are digital values indicative of gray-scale values that are utilized by the display driver of the television display to drive pixels in each color channel within the television display.

In still yet another embodiment, the digital image data comprise separate gray-scale values for at least a Red, a Green, and a Blue color subpixel.

In a still further embodiment again, the video driving signals include timestamps; the display driver comprises a timing generator configured to generate a pixel clock timing signal that controls a pixel clock period; and the display driver is configured to coordinate the digital image data used to drive the illumination of color subpixels during a given pixel clock period using the timestamps.

In still another embodiment again, the plurality of input interfaces includes a plurality of interface selected from the group consisting of: a radio frequency (RF) tuner configured to receive a broadcast television signal; at least one input interface configured to receive an A/V source; and a network interface controller configured to transmit and receive digital data via a network connection.

In a still further additional embodiment, the plurality of input interfaces includes a network interface controller configured to transmit and receive digital data via a network connection; and the A/V processing system further comprises a network streaming client that configures the processor and the network interface controller to obtain a stream of A/V content via the network connection.

In a yet further embodiment again, the media director application is configured to store data describing the native resolution and at least one refresh rate supported by the television display.

In yet another embodiment again, the A/V processing system further comprises at least one bus expansion slot configured to receive additional hardware.

A yet further additional embodiment also includes a second television display; and the A/V processing system is configured to broadcast the video driving signals to both television displays using the processed video output interface.

Another further embodiment also includes a second television display, and the A/V processing system is configured to output a second set of video driving signals to the second television display using the processed video output interface.

In still another further embodiment, the pixel array in the television display is configured to project an image onto a surface.

In yet another further embodiment, the television display is configured to present an image via the pixel array.

DETAILED DISCLOSURE OF THE INVENTION

Turning now to the drawings, television systems incorporating a television display and a separate A/V processing system configured to decode video inputs and output video driving signals at the native resolution of the television display in accordance with embodiments of the invention are illustrated. In several embodiments, the media director functionality of the television system is implemented by the A/V processing system, which includes electronics for processing input audio and video (A/V) sources and associated interface electronics. The media director can enable a user to perform a variety of functions including (but not limited to) selecting between A/V sources, selecting between A/V outputs, interacting with applications, and reviewing program guide information. The A/V processing system stores data describing the television display characteristics of one or more television displays and decodes video inputs to generate video driving signals that are specific to the television display(s) on which the video inputs are to be displayed. The process of generating the video driving signals can involve performing any of the processes that are typically performed by a conventional television in decoding a received video signal and converting the decoded video into digital image data that can be used to drive a pixel array at its native resolution and is at a supported refresh rate such as (but not limited to) de-interlacing the received video, performing scan rate conversion, performing chroma resampling and color conversion, rescaling the video to the television display resolution, and/or performing bit extraction and byte packing to format the bits of the digital image data for each pixel for provision as an input to the display driver of the pixel array of the television display. In many embodiments, the A/V processing system provides the video driving signals to the television display wirelessly. In several embodiments, the A/V processing system provides the video driving signals to the television display via a wired connection such as (but not limited to) a thin form factor cable, or an optic fiber.

In a number of embodiments, the television system also includes a wireless power system that wirelessly transmits a power signal to the television display that is used to power the television display. In other embodiments, a power system is provided that provides a direct current power source to the television display via a wired connection.

In several embodiments, the A/V processing system is modular and includes an internal bus system that enables modular plugin expansion. In this way, the capabilities of the A/V processing system can be customized to the needs of individual users. For example, additional video and/or audio inputs can be accommodated by adding additional video and/or audio input source modules. In addition, the capabilities of the television system can be expanded over time to support additional audio and/or video codecs, and/or networking technologies. Furthermore, the consolidation of capabilities such as television tuners, cable cards, digital video recorders, application platforms and/or streaming media clients into a single device can enable for more coordinated control via a single remote control unit. As well, replication of audio and video format encode/decode circuitry at the interface for each source input can be eliminated via the internal bus system.

Television systems and methods for decoding video selected from multiple video sources using an A/V processing system to drive a separate television display in accordance with embodiments of the invention are discussed further below.

Television System Architectures

Television systems in accordance with many embodiments of the invention include a television display that is configured to receive a video driving signal from an audio and video (A/V) processing system. The video driving signal can be received wirelessly or via a wired connection. Similarly, the television display can receive power wirelessly or via a power cable. In many embodiments, the only video input that can be receive by the television display is the video driving signal provided by the A/V processing system. In other embodiments, the television display includes the capability to receive A/V signals via any of a variety of inputs including a broadcast television A/V signal, a streaming A/V signal received via a network connection, and/or an A/V signal received via an A/V input interface such as (but not limited to) an HDMI interface and/or a USB interface. In this way, a video driving signal received from an A/V processing system in accordance with an embodiment of the invention is simply one of a number of video inputs that can be utilized to drive the television display.

Figure 1:
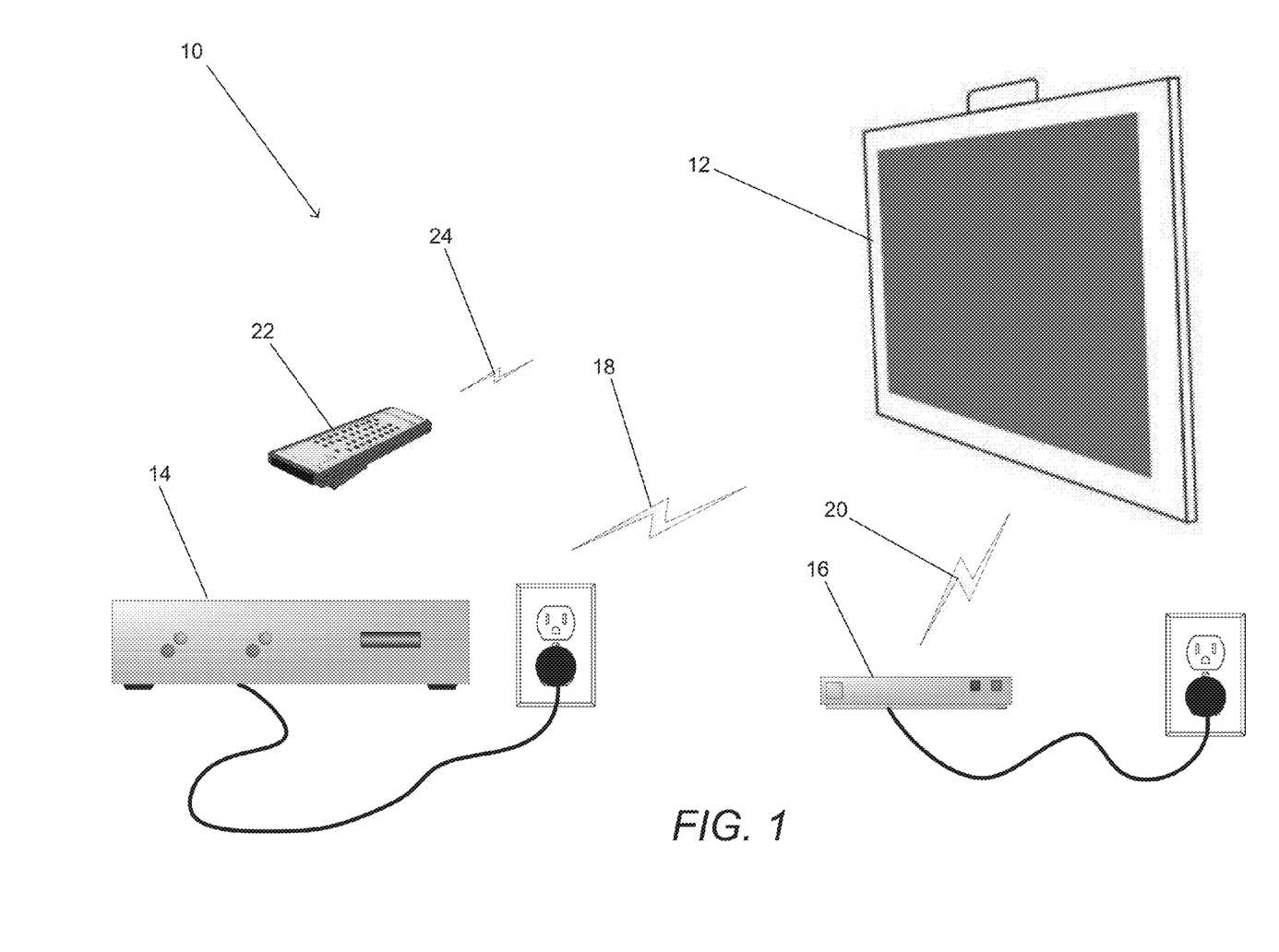
FIG. 1 conceptually illustrates a television system including an A/V processing system that is capable of generating video driving signals for a television display from a variety of video inputs in accordance with an embodiment of the invention.

A television system incorporating a television display that receives a video driving signal wirelessly from an A/V processing system and is wirelessly powered in accordance with an embodiment of the invention is illustrated in FIG. 1. The television system 10 includes a television display 12 configured to communicate wirelessly with an A/V processing system 14. As is discussed further below, the A/V processing system 14 can receive A/V inputs from a variety of sources and is configured to decode and convert a video input to generate a video driving signal that can drive the pixels of the television display. In the illustrated embodiment, the A/V processing system 14 generates a video driving signal that is wirelessly transmitted 18 to the television display 12. In other embodiments, the video driving signal can be transmitted via a wired connection to the television display 12.

In many embodiments, the process of decoding and converting the video input involves scaling the decoded video to the native resolution of the television display and/or performing scan-rate conversion to provide video driving signals at a refresh rate supported by the television display. In several embodiments, the process of decoding and converting the video input also involves converting the color space of the video input to the color space and/or color depth of the television display. As noted above, the television display can include a display technology that presents images and/or video, and/or a display technology that projects images and/or video. Where the television display includes a Liquid Crystal Display (LCD), the color space of the video input can be converted to a gamma-corrected RGB color space that adjusts for the nonlinear properties of the LCD. The number of bits used to represent each color channel in the color space (i.e. the color depth) can be determined by the number of gray-scale levels supported by the pixels of the LCD. In other embodiments, any of a variety of color conversions can be performed appropriate to the specific display technology utilized in the television display. In many systems, however, color conversion is not performed in the A/V processing system. In many embodiments, the A/V processing system supports different mappings and the user can select a mapping most suited to the displayed content. Where the television display includes a projection technology, techniques including (but not limited to) those described in U.S. Patent Publication No. 2005/0168698 entitled "Video Projector and Method for Shifting Projected Picture" to Nagayoshi can be utilized by the A/V processing system to generate video driving signals from encoded video inputs. As can readily be appreciated, the specific processes utilized by the A/V processing system typically depend upon the display technology utilized in the television display, and/or the processing capabilities of the television display. Furthermore, the processes that are performed by the A/V processing system are processes that are often performed by circuitry contained within conventional televisions that utilize similar display technologies. In several embodiments, the circuitry that processes the input sources to generate video driving signals is contained within a replaceable module that can be connected via a bus interface of the A/V processing system as needed based upon the specific display technologies of the one or more television displays communicating with the A/V processing system. In several embodiments, the A/V processing system has a user interface and/or is configured to communicate with a network connected device to enable identification of the television display and/or display technology utilized by the television display. The A/V processing system can then use local sources of information and/or information obtained from a remote server computer to obtain configuration information for the specific television display, enabling generation of video driving signals for the television display.

In several embodiments, the television display is able to receive and pass remote control signals to the A/V processing system. In a number of embodiments, the remote control commands can include commands that modify the processing of video such as (but not limited to) commands that adjust the brightness and color of the displayed video.

In embodiments where wireless transmission of the video driving system is utilized, any of a variety of standards for the uncompressed digital transmission of high-definition video can be utilized including (but not limited to) the WirelessHD specification published by Wireless HD, LLC of Sunnyvale, Calif., the IEEE 802.11ad (WiGig) specification published by the Wi-Fi Alliance of Austin, Tex. In other embodiments, any of a variety of standards for wireless and/or physical transmission of uncompressed video data can be utilized that can support to the native resolution, color depth, and refresh rate of a television display as appropriate to the requirements of specific applications in accordance with embodiments of the invention.

The television system 10 also includes a wireless power system 16 that generates an RF signal (20) that wirelessly provides power to the television display 12. In a number of embodiments, wireless power can be provided using a direct wireless power source such as the direct wireless power sources provided by WiTricity Corporation of Watertown, Mass. In other embodiments, any of a variety of techniques for obtaining wireless power or power via a physical connection can be utilized as appropriate to the requirements of specific applications in accordance with embodiments of the invention. In the illustrated embodiment, both the A/V processing system 14 and the wireless power system 16 obtain power from the electricity grid using power cables.

When video driving signals and power are both provided wirelessly, the television display 12 does not require any cables. Therefore, the process of mounting the television display can be greatly simplified. In other embodiments, cabling is reduced but not eliminated. For example, the television display can receive power from a power outlet using a power cable and/or a cable can be utilized to connect the A/V processing system to the television display. Even when cables are reduced, reduced power consumption on the part of the television display compared to a conventional television can enable the use of smaller form factor DC power cables, or light weight batteries.

Although specific television systems are described above with reference to FIG. 1, any of a variety of television systems can be constructed using a television display and an A/V processing system configured to generate video driving signals at the native resolution of the television display in accordance with embodiments of the invention. Various television displays, A/V processing systems and power supplies that can be utilized in television systems in accordance with embodiments of the invention are discussed further below.

Television Displays

Television displays in accordance with many embodiments of the invention include a pixel array that is driven by a display driver. In a number of embodiments, the input to the display driver is a video driving signal received via a processed video receiver. As noted above, the processed video receiver can receive the video driving signal via a wireless communication channel and/or a wired communication channel. The television display also includes a power supply that powers the electronics in the television display. In a number of embodiments, the power supply receives an RF signal that provides wireless power to the television display. In several embodiments, the power supply receives power via a power cable.

Figure 2A:
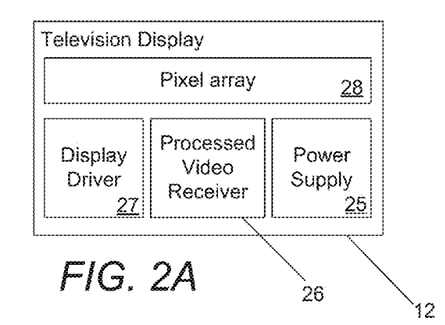
FIGS. 2A and 2B are block diagrams that conceptually illustrate a television display and an A/V processing system in accordance with embodiments of the invention.

A television display in accordance with an embodiment of the invention is illustrated in FIG. 2A. The television display 12 is powered by a power supply 25 and receives video driving signals via a processed video receiver 26. The video driving signals are provided as inputs to a display driver 27, which generates timing and control signals to drive a pixel array 28. In many embodiments, the video driving signal is provided using Low Voltage Differential Signaling (LVDS) that transmits a pixel clock signal, a horizontal sync signal, a vertical sync signal, and red, green, and blue digital image data. In a number of embodiments, the video driving signals include timestamps, the display driver includes a timing generator configured to generate a pixel clock timing signal that controls a pixel clock signal, and the display driver is configured to coordinate the digital image data used to drive the illumination of color subpixels during a given pixel clock period using the timestamps. In several embodiments, the processed video receiver 16 communicates with the display driver in accordance with any standard appropriate to the requirements of a specific application including (but not limited to) the Internal DisplayPort or Embedded DisplayPort standards developed by the Video Electronics Standards Association of Newark, Calif.

In many embodiments, the video driving signal received by the processed video receiver is at the native resolution of the television display 12 and includes digital image data for each of the pixels in the television array. In a number of embodiments, the digital image data is formatted using a binary representation that can be directly provided to the display driver to drive the pixel array (e.g. the binary representation directly corresponds to voltage levels applied to the RGB pixels in a TFT-LCD pixel array). In several embodiments, the digital image data includes binary representations of gray-scale values that are utilized to drive pixels in each color channel within the television display (e.g. Red, Green, and Blue pixels). In other embodiments, the digital image data requires conversion to the color space of the television display and/or the number of bits per pixel utilized by the display driver to drive the pixel array and the conversion is performed by a video processor that provides the resulting digital image data to the display driver. In a number of embodiments, the television display includes a backlit LED display technology and the video driving signal can also include localized and/or global backlighting control information. In certain embodiments, the television display includes additional ambient color lighting and the video driving signal can also include ambient color lighting control information for ambient lighting pixels configured to project light around the perimeter of the television display.

Although specific television displays are described above with reference to FIG. 2A, as can readily be appreciated a television display can be implemented using any of a variety of circuitry configured to receive video driving signals and/or other video inputs and to generate video displays using any of a variety of display technologies appropriate to the requirements of specific applications in accordance with embodiments of the invention. Accordingly, the characteristics of the video driving signal that is generated by an A/V processing system is typically determined by the characteristics of the television display being driven by the video driving signal. A/V processing systems and the generation of video driving signals in accordance with embodiments of the invention are discussed further below.

A/V Processing System

A/V processing systems in accordance with many embodiments of the invention select between a number of A/V inputs and generate video driving signals that are provided to a separate television display. The A/V inputs typically include an RF receiver designed to receive a broadcast television signal. Additional A/V inputs can include A/V inputs received via A/V input connectors and A/V streams received via network connections. As noted above, the specific video driving signals generated by the A/V processing system are determined based upon the characteristics of the television display. In many embodiments, video driving signals are generated so that digital image data is provided for an array of pixels corresponding to the native resolution of the television display and at a refresh rate that is supported by the television display. In several embodiments, the digital image data is formatted in accordance with the color space and color depth of the television display.

Figure 2B:
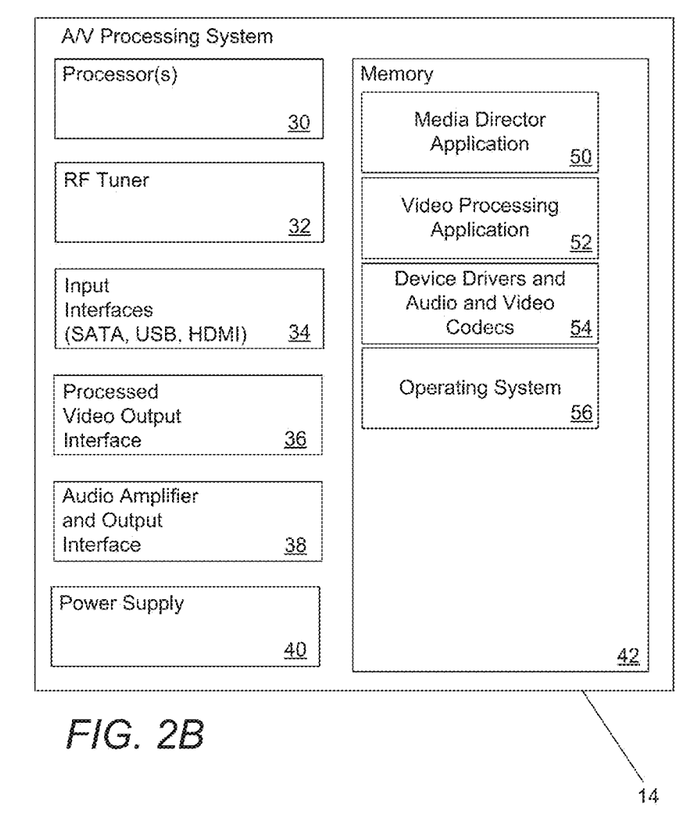

An A/V processing system in accordance with an embodiment of the invention is illustrated in FIG. 2B. The A/V processing system 14 includes a processor 32, an RF tuner 32, input interfaces 34, a processed video output interface 36, an audio amplifier and output interface 38, a power supply, and a memory 42. In the illustrated embodiment, the memory includes non-transitory machine readable instructions corresponding to a media director application 50, a video processing application 52, a collection of one or more device drivers, audio codecs and/or video codecs 54, and the A/V processing system's operating system 56.

In the illustrated embodiment, the processor 32 can be implemented using a single general purpose processor or using a combination of general purpose and/or graphics processors. The media director application 50 configures the processor 32 to select one of a number of A/V inputs. The A/V inputs can include a broadcast television A/V signal received via the RF tuner 32, an A/V signal received via an input interface 34 using an appropriate device driver 54 including but not limited to A/V from an internal recorded A/V source and/or an external A/V source. As discussed further below, a network interface controller can also be provided to enable receipt of an A/V stream via a network connection.

Audio and video codecs 54 can be utilized to decode the audio and video from the selected A/V input. The decoded audio can be provided to the audio amplifier and audio output interface 38 to generate audio. In many embodiments, the A/V processing system includes a built-in speaker. In several embodiments, the A/V processing system provides an audio output signal to a separate audio system for the production of sound.

The video processing application 52 uses the decoded video signal to generate video driving signals. In many embodiments, the video driving signals include digital image data for an array of pixels at the native resolution and at a supported refresh rate of the television display to which the video driving signals are transmitted. In several embodiments, the video processing application generates the video driving signals by rescaling the video and performing color map conversion. In other embodiments, any of a variety of processes that can be utilized to generate binary signals that can be provided as inputs to a display driver can be utilized in accordance with embodiments of the invention. In a number of embodiments, the process of generating the video driving signals involves generating timestamps corresponding to pixel display times that are included in the video driving signals along with the digital image data for each pixel. As can readily be appreciated, the specific data included in the video driving signals typically depends upon the capabilities of the display driver incorporated within the television display that is the intended recipient of the video driving signal. In many embodiments, the media director application stores data describing the television displays with which the A/V processing system can communicate and uses the data to configure the video processing application to generate an appropriate video driving signal. Such data can include (but is not limited to) the native resolution of the television display and/or color map conversions that can be used to map decoded pixel values into the color map of the television display.

The media director application 50 can configure the processor 30 to transmit the video driving signals to one or more television displays using the processed video output interface 36. As discussed above, any of a variety of wired and/or wireless data transfer protocols appropriate to the transfer of uncompressed video data can be utilized as appropriate to the requirements of specific applications in accordance with embodiments of the invention.

Although specific A/V processing system implementations are described above with reference to FIG. 2B, any of a variety of components and software applications can be utilized to implement an A/V processing system in accordance with embodiments of the invention. A variety of other A/V processing system implementations in accordance with embodiments of the invention are described further below with reference to FIG. 4. Before discussing more complex A/V processing systems, processes for generating video driving signals in accordance with embodiments of the invention are considered.

Generating Video Driving Signals from A/V Inputs

Figure 3A:
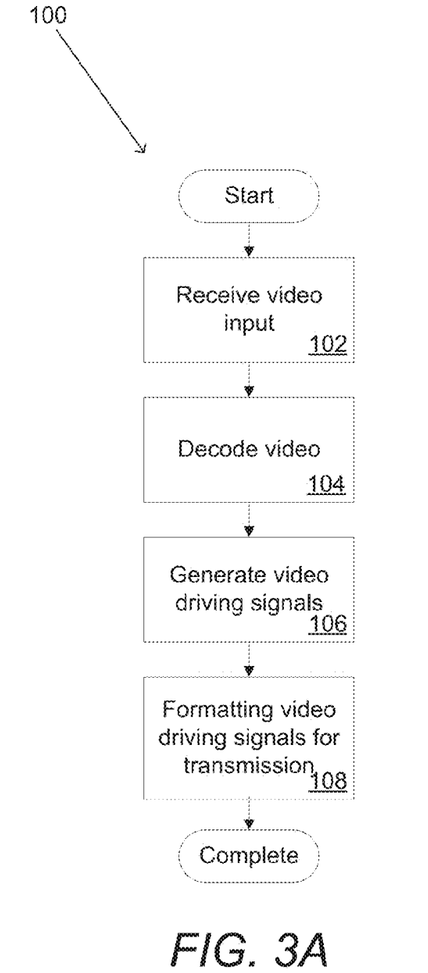
FIGS. 3A and 3B are flow charts illustrating processes for decoding a video inputs and generating video driving signals for a pixel array of a specific television display in accordance with an embodiment of the invention.

Processes for generating video driving signals from decoded video data in accordance with many embodiments of the invention can utilize any of a variety of techniques used by conventional televisions for generating signals to drive a pixel array. A generalized process for generating video driving signals in accordance with an embodiment of the invention is illustrated in FIG. 3A. The process 100 includes receiving (102) a video input, decoding (104) the video, generating (106) video driving signals using the decoded video data, and formatting (108) the video driving signals for transmission to the television display.

The specific processes utilized within the generalized process illustrated in FIG. 3A typically depend upon the nature of the video input and the requirements of the display driver of the television display. The Advanced Television Systems Committee (ATSC) of Washington D.C. has published various standards that are utilized in the digital transmission of A/V to High Definition Televisions. The ATSC system supports a number of different display resolutions, forms of scanning (progressive or interlaced), aspect ratios, and frame (or field) rates. For transport, ATSC uses the MPEG transport stream specified by the Motion Picture Experts Group, which is a working group of ISO/IEC with the mission to develop standards for coded representation of digital audio and video and related data. Before decoding of audio and video takes place, an A/V processing system typically demodulates and applies error correction to the signal. The video contained within the MPEG transport stream can be encoded in accordance with the MPEG-2 video encoding standard or in accordance with the H.264/MPEG-4 AVC video encoding standard. Various adaptive and progressive download streaming technologies are also utilized to stream video over the Internet including (but not limited to) the MPEG-DASH standard published as ISO/IEC 23009-1:2013, HTTP Adaptive Streaming developed by Apple, Inc. of Cupertino, Calif., Smooth Streaming developed by Microsoft Corporation of Redmond, Wash., and HTTP Dynamic Streaming developed by Adobe Systems Incorporated of San Jose, Calif. The technologies used to stream A/V content over a network can utilize any of a variety of container formats to store the A/V content and/or any of a number of codecs to encode and decode the A/V content. Depending upon the manner in which video is encoded, an appropriate video decoder can be selected to obtain an uncompressed video signal. Once an uncompressed video signal is obtained, the processes utilized to convert the frames of uncompressed video into video driving signals depend upon the characteristics of the pixel array being driven by the video driving signals.

Figure 3B:
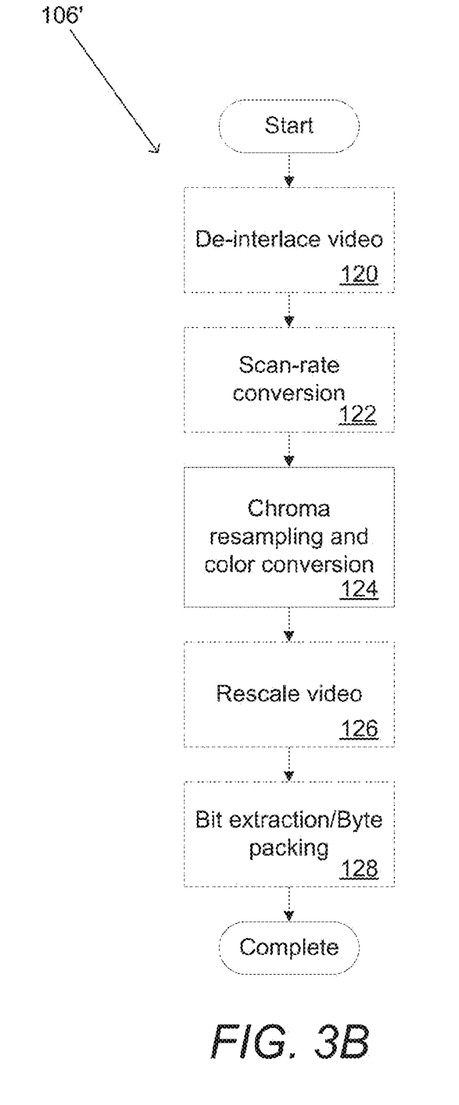

A process for generating video driving signals from frames of uncompressed video in accordance with an embodiment of the invention is illustrated in FIG. 3B. Depending upon the nature of the video source, many of the processes need not be performed. The process 106' can optionally involve de-interlacing (120) a frame of video, and performing (122) scan-rate conversion. In interlaced video, odd and even fields are separated so that all odd lines in a given frame are transferred before any even lines. Techniques including (but not limited to) line doubling, linear interpolation, motion compensation, and/or median filtering can be utilized to perform de-interlacing. Scan-rate conversion processes can be used to match the source video frame rate to the display television refresh rate. In order to match the source video frame rate to the television display refresh rate, fields may need to be dropped or duplicated. As with de-interlacing, some sort of filtering can be utilized to smooth out high-frequency artifacts.

When the frames of source video matching the television display refresh rate are obtained, chroma resampling and color conversion is performed (124). Video can be represented in any of a variety of color spaces. In order to drive a television device, the video is typically converted to the RGB color space. In the case of an LCD panel, the source video needs to be transformed to a gamma corrected version of the RGB space. Gamma correction adjusts for the non-linear properties of an LCD panel. In several embodiments, the specific color mapping can be selected from a set of predetermined color mappings by the user to achieve a desired set of color tones appropriate to the characteristics of specific content. The process of performing color mapping may also involve resampling the color channels to interpret missing chroma values. In many embodiments, higher-order filtering is also applied.

Depending upon the resolution of the video input, the video input may be rescaled (126) to the resolution of the display device. A variety of resolutions are supported within the ATSC standards, and reducing resolution is a common technique for achieving increased compression of video data used in adaptive bitrate streaming to generate alternative video streams with different maximum bitrate requirements. Where the resolution of the source video does not correspond to the resolution of the television display, upward or downward scaling can be performed as appropriate to fit the source video to the television display resolution. Any of a variety of techniques that can be utilized to perform rescaling in the context of conventional video display can be utilized as appropriate to the requirements of specific applications in accordance with embodiments of the invention including (but not limited to) dropping or duplication of rows and/or columns of pixels, linear interpolation, and/or multirate filtering.

When the video signal has been mapped to the color space of the television display at the resolution of the television display, then the resulting video driving signals can be provided to the television display. In many embodiments, the bits of the driving signal are packed (128) into predetermined word sizes for transfer to the television display. The bits of data corresponding to the video driving signals can then be formatted for transmission to the television display and/or timestamps can be inserted into the video driving signals to coordinate the timing with which the video driving signals are used to drive the illumination of the pixel array. As noted above, any of a variety of wireless and/or wired communication technologies can be utilize to transmit the video driving signals to a television display in accordance with embodiments of the invention.

Although specific processes for generating video driving signals are described above with reference to FIGS. 3A and 3B, any of a variety of processes can be utilized to decode encoded frames of video data, map the source video to the color space of the television display, and generate video driving signals at the scan-rate and resolution of the television display as appropriate to the requirements of specific applications in accordance with embodiments of the invention. A variety of A/V processing systems that can convert encoded video into video driving signals for transmission to a television display in accordance with embodiments of the invention are discussed below.

Advanced A/V Processing Systems

Relatively simple A/V processing systems in accordance with embodiments of the invention are described above with reference to FIG. 2B that possess the capability to receive A/V inputs from one or more input sources and generate video driving signals that can be provided to a television display. In many embodiments, A/V processing systems possess a variety of additional capabilities related to discovery and access of A/V content. In many embodiments, content sources encrypt content using Conditional Access (CA) and/or Digital Rights Management (DRM). Therefore, A/V processing systems in accordance with many embodiments of the invention include DRM/CA clients to enable the decoding and display of protected content. In addition, A/V processing systems can enable the recording and playback of A/V content in a manner similar to that of a conventional DVR. To assist with content discovery, many A/V processing systems possess the ability to obtain program guide data and to generate user interfaces in which the program guide data is prevented via a television display. In several embodiments, the program guide is simply one application among many supported by an application platform provided on the A/V processing system. As can readily be appreciated, any of the features that are customarily provided on a set top box and/or in an Internet connected television can be implemented on an A/V processing system in accordance with an embodiment of the invention so that the user experience in interacting with the television system is comparable to that of any combination of conventional television and/or set top box devices that can display content via a television.

Figure 4:
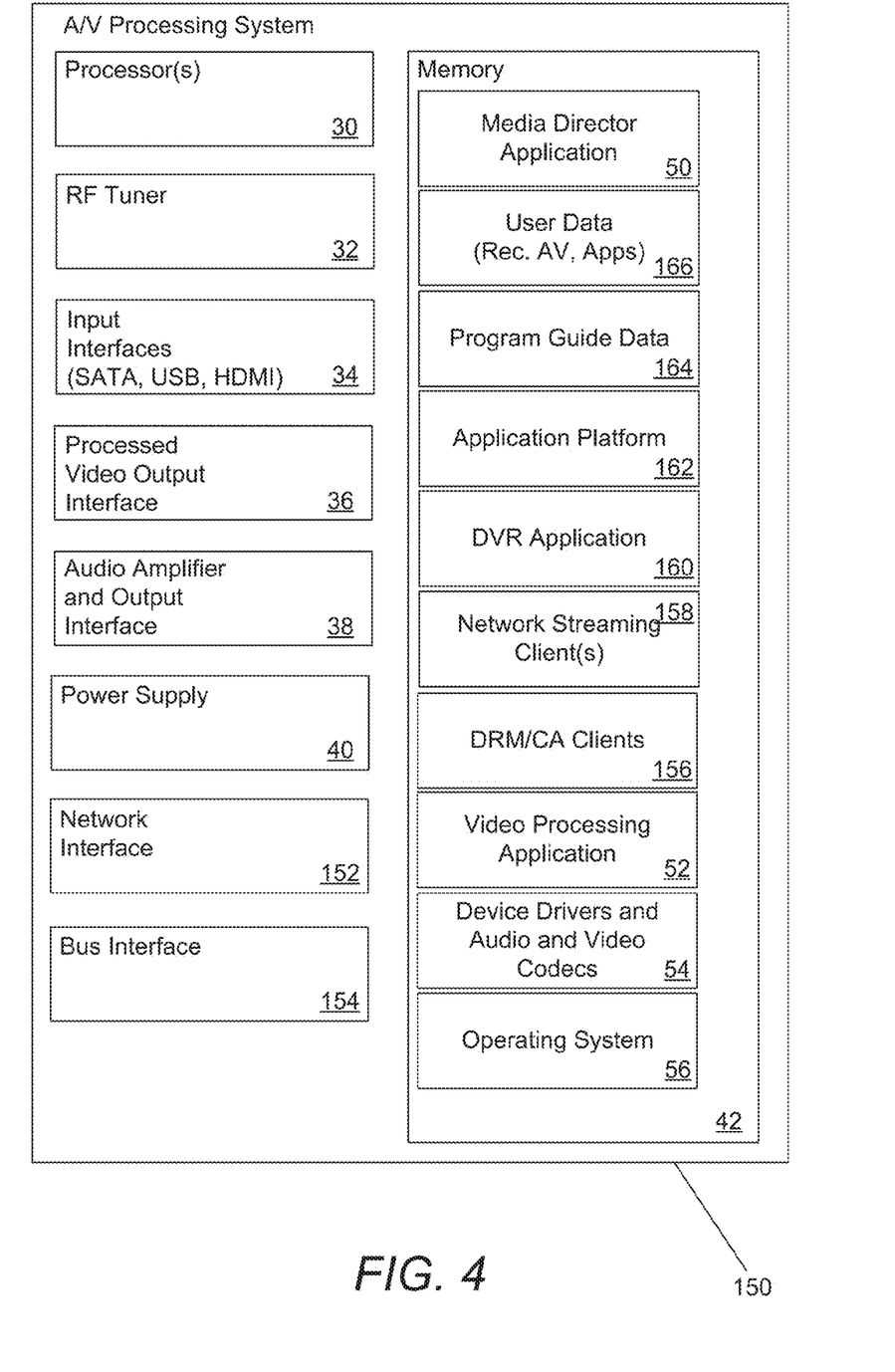
FIG. 4 is a block diagram that conceptually illustrates an A/V processing system including hardware extensibility and a variety of software applications that facilitate discovery and access of content in accordance with embodiments of the invention.

An A/V processing system that incorporates the ability to access protected content, using a program guide implemented on an application platform in accordance with an embodiment of the invention is illustrated in FIG. 4. The A/V processing system 150 is similar to the A/V processing system 14 illustrated in FIG. 2B. However, the A/V processing system 150 illustrated in FIG. 4 includes a network interface 152 to enable the A/V processing system 150 to access local area networks and/or the Internet. The A/V processing system 150 also includes a bus interface 154 that enables the capabilities of the A/V processing system to be expanded upon by the connection of additional hardware via the bus expansion slots. In several embodiments, the bus interface 154 can be utilized to enable the addition of additional input source modules.

The A/V processing system 150 also includes a variety of additional software in its memory 42. In order to access protected content, the A/V processing system is provided with one or more DRM and/or CA clients 156 that enable a user to obtain cryptographic information that can be utilized to access protected video sources in the clear. In several embodiments, A/V processing systems can also include one or more network streaming clients (156) that enable the A/V processing system to retrieve A/V content from sources via a network connection.

In the illustrated embodiment, the A/V processing system 150 includes a DVR application 160. The DVR application enables the A/V processing system to A/V sources to memory 42 for later viewing. As can readily be appreciated, a recorded A/V source can be processed in a manner similar to any other A/V source received by the A/V processing system.

Many A/V processing systems in accordance with embodiments of the invention include an application platform 162. An application platform is a framework that can be utilized by application developers to write applications that can execute on the A/V processing system. The A/V processing system can come preloaded with certain applications and/or use the network interface to download additional applications. In the illustrated embodiment, the A/V processing system can include a program guide application that utilizes program guide data 164 to create a program guide user interface that is displayed on a television display. In several embodiments, the program guide can be separately implemented as part of a media direction application 50 using the program guide data 164. Due to support for user applications and the recording of A/V sources using the DVR application, the illustrated A/V processing system 150 includes a variety of user data 166 stored in memory 42. As can readily be appreciated, the specific user data stored in memory is largely dependent upon the requirements of specific software capabilities of an A/V processing system implemented in accordance with embodiments of the invention.

Although specific variations in the implementation of A/V processing systems are described above with reference to FIG. 4, any of a variety of software applications and hardware capabilities can be utilized within an A/V processing system to provide hardware extensibility and to provide software capabilities appropriate to the requirements of specific applications in accordance with embodiments of the invention. A capability of all of the A/V processing systems described above with reference to FIG. 4 is the ability to generate video driving signals from encoded video sources and to provide the video driving signals to a television display in accordance with embodiments of the invention. Television displays possessing a variety of capabilities in accordance with embodiments of the invention are discussed below.

Television Displays Incorporating Selectable A/V Inputs

While much of the above discussion describes television systems in the context of an A/V processing system that performs the decoding of video to generate video driving signals for a television display, television systems in accordance with many embodiments of the invention can utilize television displays that possess the ability to generate video driving signals from one or more encoded video sources in addition to receiving video driving signals from an A/V processing system.

Figure 5:
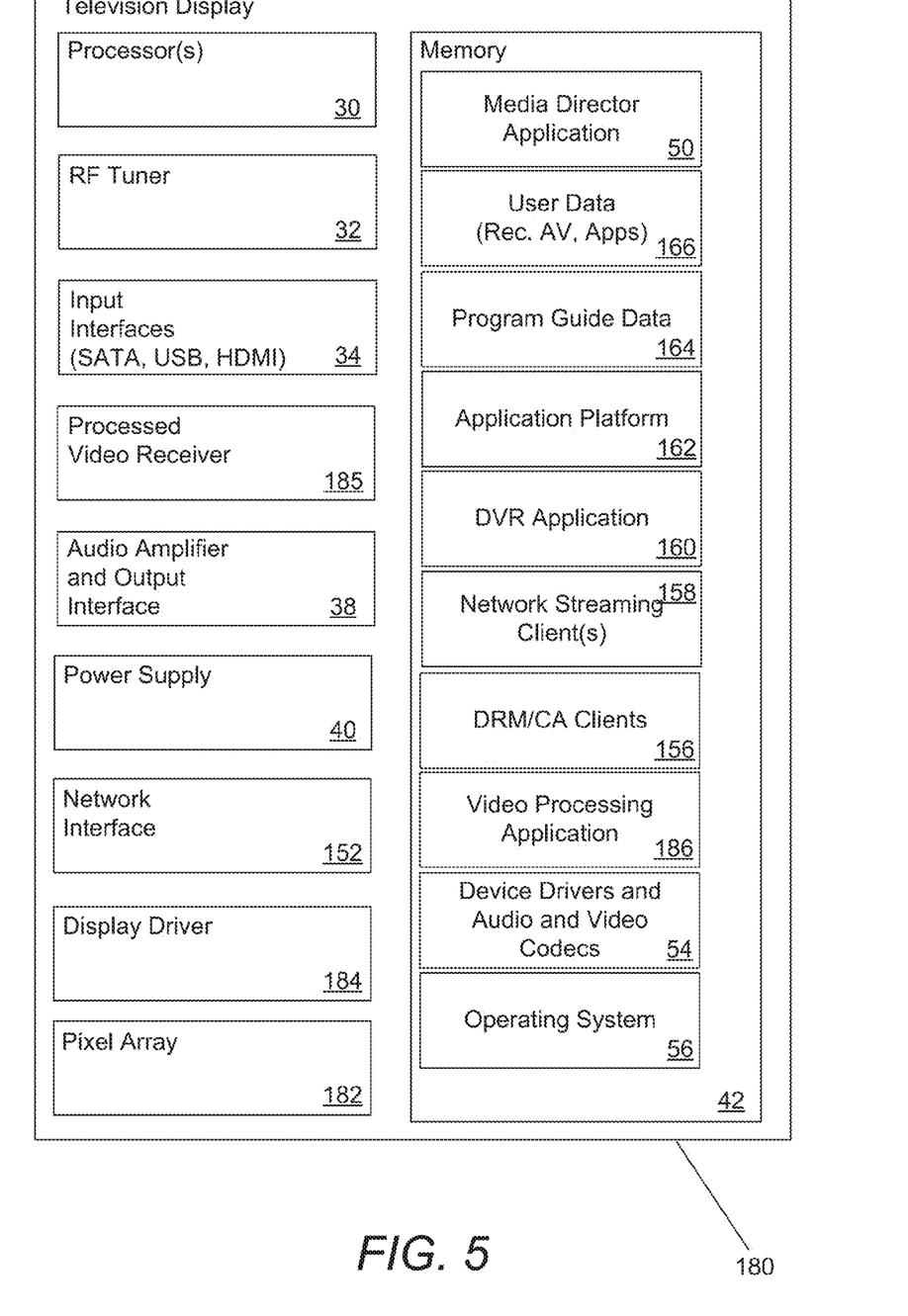
FIG. 5 is a block diagram that conceptually illustrates a television display that is configured to receive video driving signals from a display device and/or generate video driving signals from one or more video inputs in accordance with embodiments of the invention.

A television display configured generate video driving signals from encoded video signals and to receive video driving signals from an A/V processing system in accordance with an embodiment of the invention is illustrated in FIG. 5. The television display 180 can include many of the same components as the A/V processing system 150 shown in FIG. 4 with the exception that the television display 180 includes a pixel array 182 that is driven by a display driver 184. The television display can receive video driving signals directly from an A/V processing system via a processed video receiver 185. In addition, the television display can receive A/V sources in a conventional manner via an RF tuner 32 and/or any of a variety of input interfaces 34. The television display can decode received encoded video, and generate video driving signals using appropriate video codecs 54 and a video processing application 186. In many embodiments, the television display includes a media director application to enable selection between different A/V inputs.

Although specific television displays incorporating the ability to both receive video driving signals from an A/V processing system and generate video driving signals from encoded video received via an RF tuner and/or an input interface are discussed above with reference to FIG. 5, any of a variety of television displays that include the ability to receive video driving signals and generate video driving signals from encoded video sources can be utilized as appropriate to the requirements of a specific television system in accordance with embodiments of the invention. Systems and methods for powering television displays utilized in television systems in accordance with embodiments of the invention are discussed further below.

Television Display Power Systems

Figure 6A:
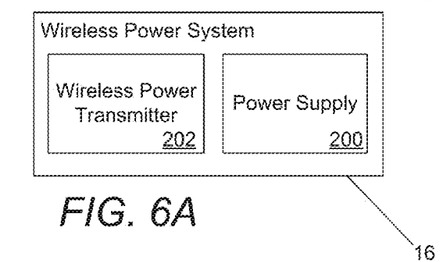
FIGS. 6A and 6B are block diagrams that conceptually illustrate power supplies that can be utilized to provide power to a television display in accordance with an embodiment of the invention.
Figure 6B:
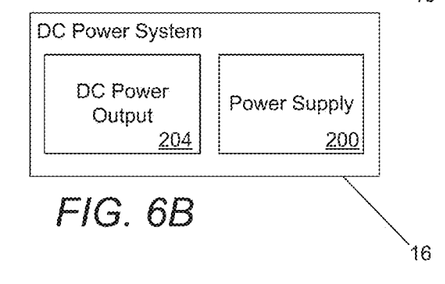

As noted above, the form factor of the power cable utilized to power a television display can be reduced and/or eliminated entirely by reducing the amount of electronics within a television display required to display an encoded video source on the television display. By shifting much of the electronics to an A/V processing system, the power budget of a television display in accordance with many embodiments of the invention can be sufficiently reduced to enable powering of the television display via a small form factor DC cable and/or using a wireless power transmitter. A wireless power system incorporating a wireless power transmitter that can be utilized to power a television display in accordance with an embodiment of the invention is illustrated in FIG. 6A. The wireless power system 16 includes a power supply 200 and a wireless power transmitter 202. When a wireless power receiver is incorporated in a related television display, the wireless power transmitter 202 can provide sufficient energy to power the electronics within the television display. As an alternative, a DC power system similar to the DC power system shown in FIG. 6B can be utilized. The DC power system 16 includes a power supply 200 that converts an AC power source into a DC power supply and incorporates a DC power output 204 that can be utilized to provide DC power to a television display. In other embodiments, any or a variety of power sources can be utilized to power a television display including (but not limited) to incorporating a power supply within the television display to enable the television supply to obtain power directly from the grid via a conventional power outlet.

Broadcasting to Multiple Television Displays

Figure 7:
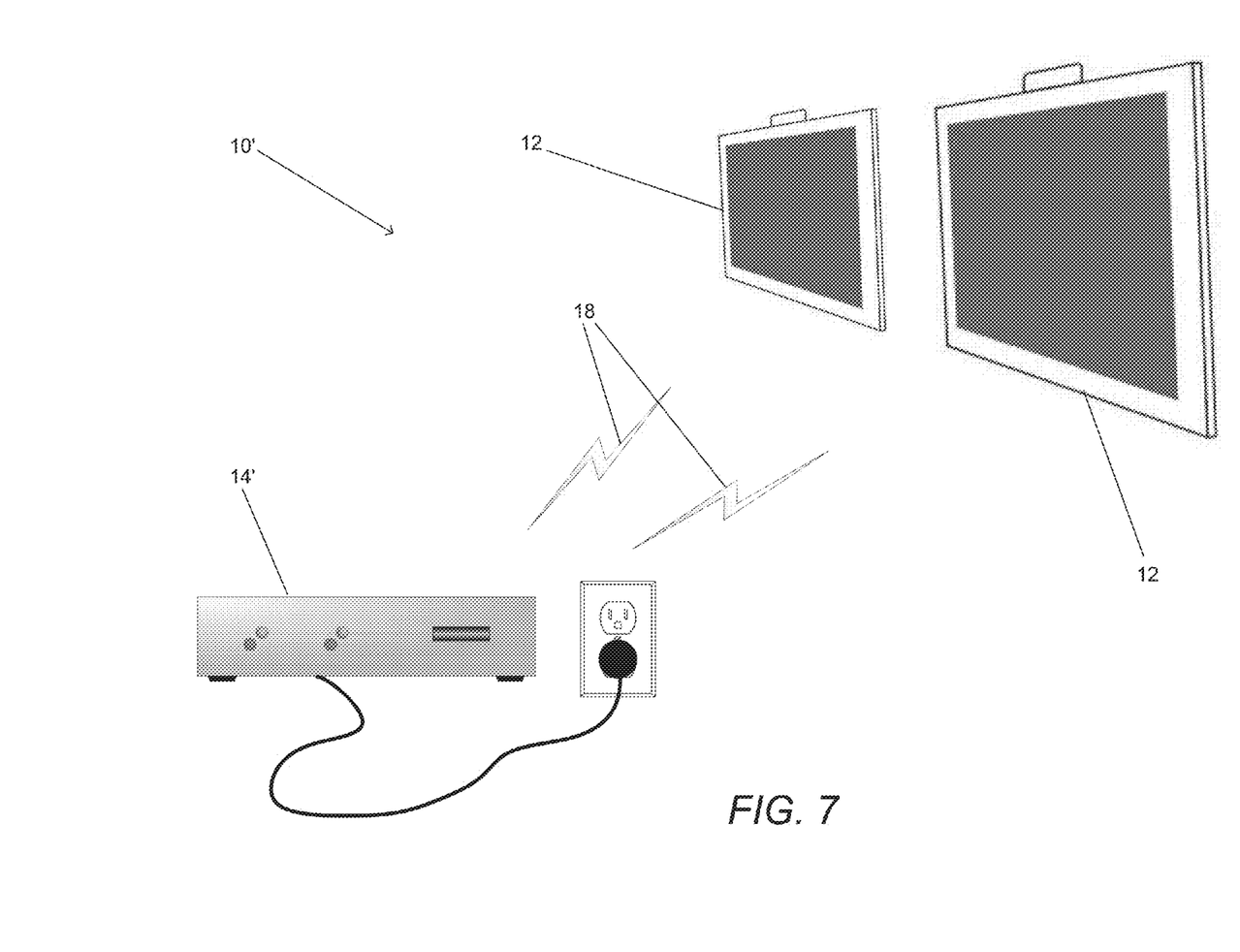
FIG. 7 conceptually illustrates a television system including an A/V processing system that is capable of broadcasting video driving signals to multiple television displays in accordance with an embodiment of the invention.

Much of the above discussion describes the transmission of video driving signals to a single television display. Television systems in accordance with many embodiments of the invention enable the broadcasting of a video driving signals to multiple similar television displays. A television system in which a single A/V processing system wirelessly broadcasts television driving signals to two television displays in accordance with an embodiment of the invention is illustrated in FIG. 7. The illustrated television system 10' is similar to the television system 10 shown in FIG. 1 with the exception that the A/V processing system 14' broadcasts video driving signals to two similar television displays 12. As can readily be appreciated, the ability to broadcast video driving signals can be extremely useful in the context of a public space such as an airport or a sports bar, where the same video content is desired to be presented on multiple display devices.

Although the television systems described above with reference to FIG. 7 utilize wireless broadcasting of video driving signals, any of a variety of wireless and/or wired communication techniques can be utilized to provide video driving signals to multiple television displays as appropriate to the requirements of specific applications in accordance with embodiments of the invention. Furthermore, a single A/V processing system in accordance with embodiments of the invention can simultaneously process different video sources to send different video driving signals to different television displays and/or process the same video source in multiple different ways to simultaneously generate video driving signals appropriate to different television displays. Accordingly, television systems in accordance with embodiments of the invention should be understood as in no way limited to the processing of a single video source and/or the generation of single set of video driving signals. Indeed, in many embodiments A/V processing systems include expansion capabilities to provide the ability to simultaneously process additional video sources and/or generate additional set of video driving signals.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A television system, comprising:
   a television display comprising:
      a pixel array formed by rows and columns of pixels having a native resolution that are configured to be illuminated at one or more supported refresh rates using timing and control signals;
      an input interface configured to receive video driving signals, where the video driving signals comprise timing information and digital image data for each of the pixels in the pixel array at a supported refresh rate;
      a display driver configured to generate timing and control signals to drive the pixel array based upon the video driving signals by: generating timing signals using the timing information; and mapping the digital image data for each pixel to a control signal for each pixel;
      a power supply configured to provide power to the pixel array, the input interface and the display driver;
   an audio and video (A/V) processing system housed separately from the television display, wherein the video processing system comprises:
      a processor;
      a memory containing:
         a media director application;
         a video processing application;
         at least one audio codec;
         at least one video codec; and
         an operating system;
      a plurality of input interfaces configured to receive encoded A/V data, where the plurality of input interfaces comprises a radio frequency tuner configured to receive a broadcast television A/V signal;
      a processed video output interface;
      a power supply configured to power the processor, memory, and processed video output interface;
      wherein the media director application configures the processor to:
         select an A/V source from the plurality of input interfaces;

decode audio data and video data from the selected A/V source using the at least one audio codec and the at least one video codec;

generate video driving signals from the decoded video data using the video processing application, where the video driving signals includes digital image data at a resolution consistent with the native resolution of the pixel array in the television display and a supported refresh rate of the pixel array of the television display; and output the video driving signal to the television display via the processed video output interface.

2. The television system of claim 1, wherein the timing information is comprised of timestamps.

3. The television system of claim 1, wherein the A/V processing system is configured to wirelessly transmit the video driving signal to the television display using the processed video output interface.

4. The television system of claim 1, wherein the A/V processing system is configured to transmit the video driving signal to the television display via a wired connection using the processed video output interface.

5. The television system of claim 1, further comprising:
a wireless power supply including a wireless power transmitter;
wherein the power supply of the television display includes a wireless power receiver configured to receive a power from a wireless power signal transmitted by the wireless power supply.

6. The television system of claim 1, further comprising:
a television display power supply separately housed from the television display and configured to provide a direct current (D.C.) output;
wherein the power supply of the television display is configured to receive the D.C. output of the television display power supply.

7. The television system of claim 1, wherein the media director application configures the processor to generate video driving signals from the decoded video data using the video processing application by performing at least one process selected from the group consisting of:
di-interlacing the decoded video data;
performing scan-rate conversion on the decoded video data to match the frame rate of the decoded video data to a supported refresh rate of the pixel array of the television display;
performing chroma resampling of the decoded video data;
converting a color space of the decoded video data to a color space of the display driver;
rescaling the decoded video data to the native resolution of the pixel array; and
performing bit extraction and byte packing.

8. The television system of claim 1, wherein the media director application configures the processor to generate video driving signals from the decoded video data using the video processing application by converting a color space of the decoded video data to a color space of the display driver.

9. The television system of claim 8, wherein converting the color space of the decoded video data to the color space of the display driver comprises converting the color space of the decoded video data to a gamma corrected color space.

10. The television system of claim 8, wherein converting the color space of the decoded video data to the color space of the display driver comprises converting the color space of the decoded video data to a color space selected by a user command from a plurality of predetermined color spaces.

11. The television system of claim 8, wherein the media director application also configures the processor to generate video driving signals from the decoded video data using the video processing application by:
performing scan-rate conversion on the decoded video data to match the frame rate of the decoded video data to a supported refresh rate of the pixel array of the television display; and
rescaling the decoded video data to the native resolution of the pixel array.

12. The television system of claim 1, wherein the digital image data are digital values indicative of gray-scale values that are utilized by the display driver of the television display to drive pixels in each color channel within the television display.

13. The television system of claim 12, wherein the digital image data comprise separate gray-scale values for at least a Red, a Green, and a Blue color subpixel.

14. The television system of claim 12, wherein:
the video driving signals include timestamps;
the display driver comprises a timing generator configured to generate a pixel clock timing signal that controls a pixel clock period; and
the display driver is configured to coordinate the digital image data used to drive the illumination of color subpixels during a given pixel clock period using the timestamps.

15. The television system of claim 1, wherein the plurality of input interfaces includes a plurality of interface selected from the group consisting of:
a radio frequency (RF) tuner configured to receive a broadcast television signal;
at least one input interface configured to receive an A/V source; and
a network interface controller configured to transmit and receive digital data via a network connection.

16. The television system of claim 1, wherein:
the plurality of input interfaces includes a network interface controller configured to transmit and receive digital data via a network connection;
the A/V processing system further comprises a network streaming client that configures the processor and the network interface controller to obtain a stream of A/V content via the network connection.

17. The television system of claim 1, wherein the media director application is configured to store data describing the native resolution and at least one refresh rate supported by the television display.

18. The television system of claim 1, wherein the A/V processing system further comprises at least one bus expansion slot configured to receive additional hardware.

19. The television system of claim 1, further comprising:
a second television display; and
the A/V processing system is configured to broadcast the video driving signals to both television displays using the processed video output interface.

20. The television system of claim of claim 1, further comprising:
a second television display; and
the A/V processing system is configured to output a second set of video driving signals to the second television display using the processed video output interface.

21. The television system of claim 1, wherein the pixel array in the television display is configured to project an image onto a surface.

22. The television system of claim 1, wherein the television display is configured to present an image via the pixel array.

\* \* \* \* \*